June 2, 1936.  B. M. STANNARD  2,042,911
TAILBOARD FOR VEHICLES
Filed Dec. 5, 1934  2 Sheets-Sheet 2

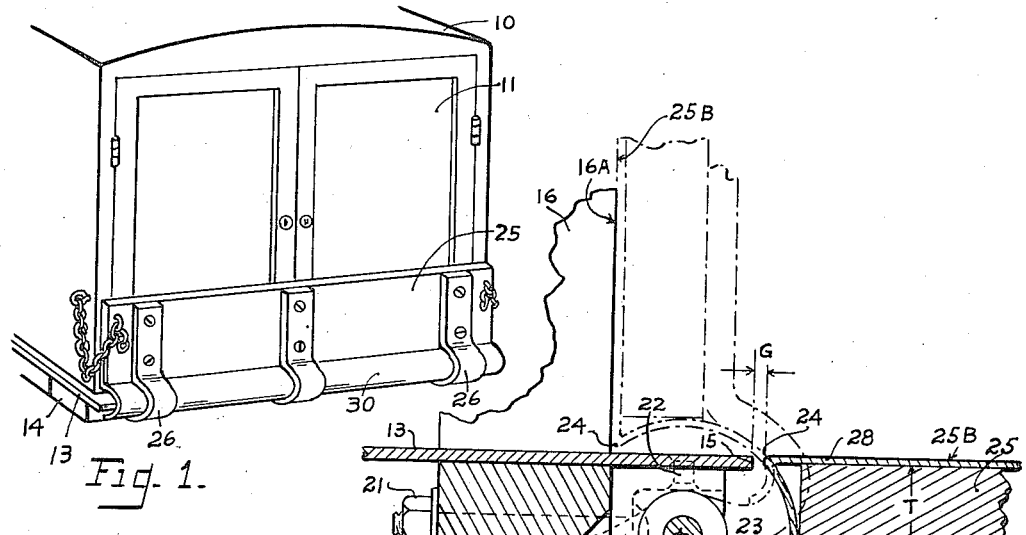
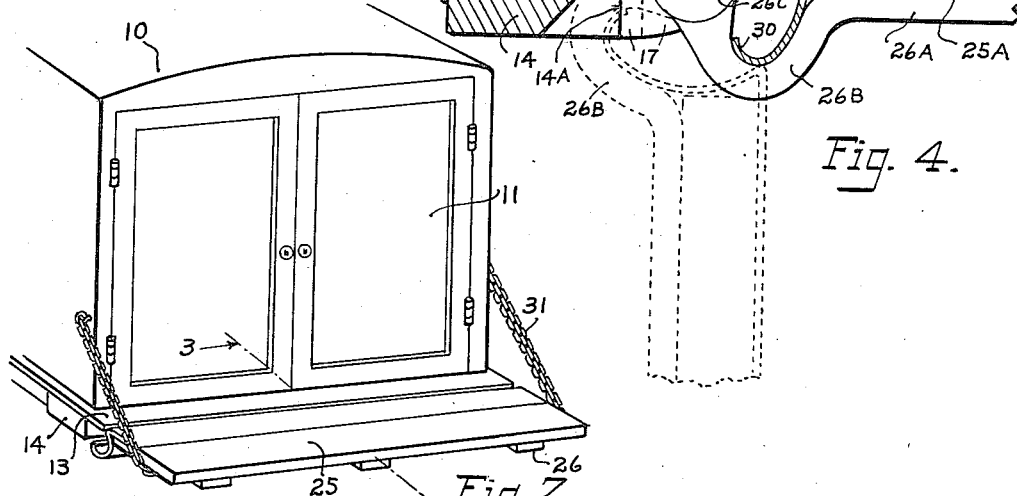
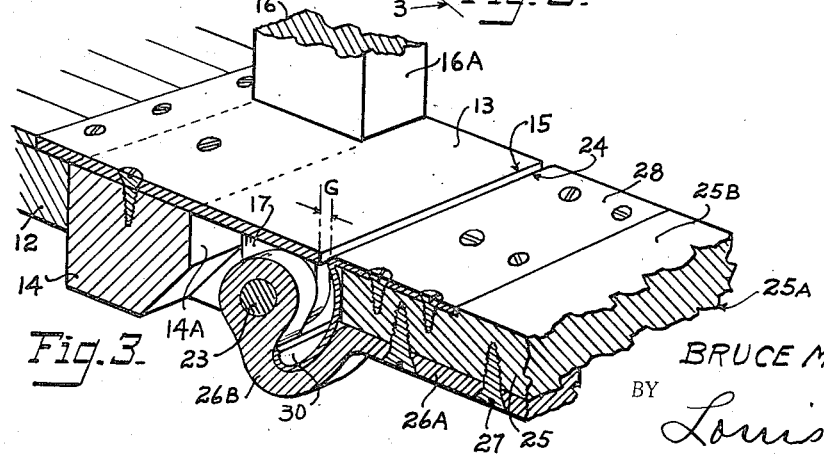

INVENTOR.
BRUCE M. STANNARD
BY Louis Illmer
ATTORNEY.

UNITED STATES PATENT OFFICE 2,042,911

TAILBOARD FOR VEHICLES

Bruce M. Stannard, Binghamton, N. Y.

Application December 5, 1934, Serial No. 757,136

4 Claims. (Cl. 296—57)

The present invention broadly pertains to vehicle body construction, and more particularly has to do with improved fittings for mounting end gate means as applied to trucks, moving vans or the like automotive conveyances. My so-called "spaceless" tail board may be hingedly attached to the rear end sill of such body framework in a substantial manner, preferably by the use of simple, heavy-duty forgings or the like guide parts.

Hinge strap means interconnect one longitudinal edge of my relatively thick tail board to rigidly mounted pintle means as carried by the body sill, the axial center of such pintle being herein disposed in a novel manner. A shelf-like rearward wing extension of my floor plate overhangs the end sill and terminates in a transverse outboard tail edge. A plurality of pintle bearing brackets are preferably mounted directly beneath such wing plate and inwardly of the tail edge confines thereof. Said brackets together with the respective guide straps, collectively constitute a guide linkage comprising complementary knuckle joints that are snugly fitted about their pivots to provide for a tail board mounting that shall be free from obnoxious rattle effects.

When one side face of the tail board is swung into retained flush alignment with the body floor, this facilitates the loading of the truck or moving van. The innermost swinging tail board edge is then guided into a closely adjacent relationship with respect to the outboard edge of the extended floor plate so as to afford a substantially continuous sectional platform without any pronounced gap therebetween. Heavy loads such as moved articles of furniture or the like, may be freely rolled thereover without danger of obstructing or breaking their casters.

In vehicle bodies of normal construction, the respective rearward faces of the upright corner posts are usually placed in approximate registry with the corresponding transverse face of the underlying sill member. The present fittings are so designed that the raised tail board is made to snugly abut the respective rearward post faces. If preferred, the tail board may likewise be made to close between such complementary posts. In either event, the radially innermost swinging edge of such erected tail board is herein brought down closely contiguous to the floor plate in order to substantially seal the body interior against inclement weather.

As a further alternative position in meeting certain loading needs, the released tail board may also be dropped downwardly into a depending relation to its supporting pintles. In order to accomplish the aforesaid purposes without interference between the movable working parts, it has been found expedient to locate the pintle axis with respect to the rearmost side face of the tail board in a certain characteristic relationship which will hereafter be more specifically defined. To this end, the pintle engaging socket end of my hinge straps are purposely crooked and respectively given a certain closely bent, gooseneck contour. Such configuration is at the same time utilized to mount a cross-sectionally trough-shaped storm trap means therein that serves to further protectively seal the joint between the closed tail board and its underlying floor plate.

The primary object of my improvements is to provide for a compact, sturdy tail board mounting of the indicated character that may be effectively applied to truck, van and the like automotive bodies by the use of simple fittings without requiring extensive changes in the prevailing body structure. Embodied herein are also other design features adapted to facilitate the fabrication and attaching of such working parts, all of which aspects will presently be set forth in detail.

Reference is had to the accompanying two sheets of drawings which are illustrative of certain specific embodiments of my invention and in which drawings:

Fig. 1 shows a partial perspective of the rear end of a van embodying my invention with the tail board raised into its closed position, while Fig. 2 is a similar view with the tail board lowered into alignment with the floor level.

Fig. 3 depicts a fragmental detail of my assembled fittings as taken along 3—3 of Fig. 2, and Fig. 4 illustrates different operative positions that may be assumed by said tail board.

Fig. 5 shows a bottom view of the style of pintle mounting brackets used in Figs. 3 and 4 but with the seal trough removed, while

Figure 5:
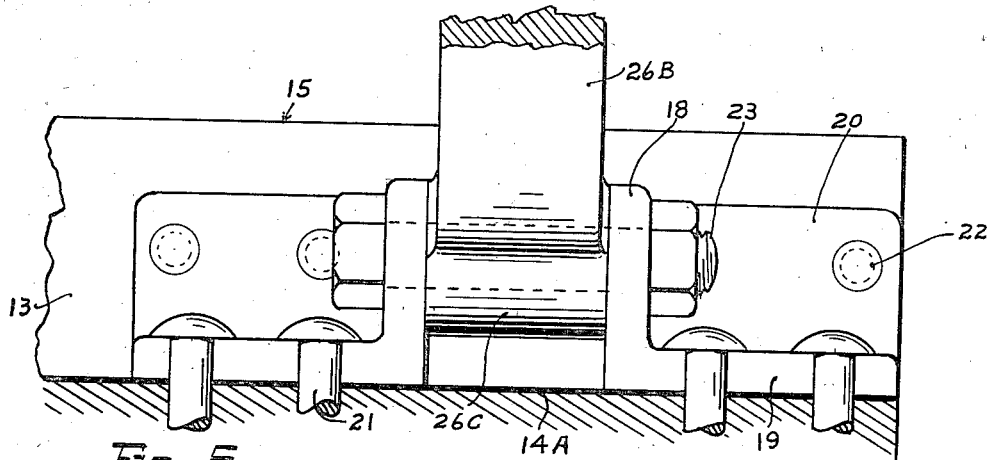

Referring more specifically to the drawings, the moving van 10 may be provided with a pair of swinging rear doors 11 to inclose the body compartment in the usual manner. As shown in Fig. 3, the rearward portion of the van or truck floor 12 may be equipped with a floor plate 13 that overlies the transversely disposed end sill 14 and having a plate wing portion thereof extended outwardly therebeyond in shelflike fashion to provide for a continuous rectilinear outboard or tail edge 15 that runs substantially parallel to the rearmost sill face 14A. A pair of conventional corner posts such as 16 may be erected at the opposite ends of the end sill with the rearmost post face 16A set in alignment with the corresponding sill face 14A. The side edges of the floor plate 13 may be indented to clear the respective posts as indicated. Directly beneath the overhanging wing plate portion, is mounted a series of reversely disposed pintle brackets such as 17.

In the exemplification detailed in Fig. 5, said bracket may include an apertured pintle boss 18, a sill flange 19 and a plate flange member 20 that are respectively disposed in rectangular relationship, as shown. The sill flange 19 may be braced by and securely affixed to the sill by bolts such as 21 while the flange 20 may also be reenforcingly attached beneath the floor plate by countersunk rivets such as 22. The respective boss apertures have a pintle 23 snugly entered therethrough, which may either be of the continuous type or divided into separate units. Two or more of such brackets serve to accurately guide the innermost swinging edge 24 of the tail board 25 in parallelism with the tail edge 15. To complete such guiding knuckle joint, each bracket may be further equipped with a pintle engaging strap of which the straight, relatively flat shank portion 26A including a side face that extends radially outward from the pintle axis and which face may be attached to the rear tail board face 25A by the screw means 27.

The pivot end region of each hinge strap is purposely crooked and given a sharp gooseneck formation to provide for a yoke portion as at 26B which is laterally offset with respect to the contour of the strap shank, as shown. The innermost free strap end terminates in a rotatable tubular socket 26C that engages the pintle. Said gooseneck disposition is such that the tail board and its respective shanks 26A may without interference, be carried around and over my unbroken rectilinear tail edge 15 without requiring the overhanging portion of the floor plate 13 to be weakened by inwardly notching or otherwise severing the continuous tail edge thereof.

In order to withstand rough usage, it is preferred to resort to a relatively heavy wooden tail board having a substantial thickness designated as T in Fig. 4, and which is kept commensurate with the corresponding end sill dimension. The opposite or front face 25B of such board may be fixedly provided with an inset metal sheathing 28 of which an intermediate portion is shown sharply kinked to form and define the innermost swinging edge 24 of my tail board. The marginal portion of the overhanging sheath member 28 may be given a cross-sectionally trough shape of which one longitudinal edge constitutes a sealing lip 30 that is preferably fitted to seat into the strap offset and extends along the entire swinging edge of my tail board.

Attention is now directed to Fig. 4, which shows the various operative positions that may be assumed by my tail board. Referring first to its horizontally extended position of Figs. 2 and 3, the tail board is intended to be retained in place by the use of conventional hook chains 31 (see Fig. 2). The axis of my pintle 23 is parallelly disposed with respect to the swinging board edge 24. A certain definite location of such axis is required to attain the results herein contemplated, it being preferred to place the pintle axis in substantial alignment with the flat rear face 25A in the Fig. 4 manner. When said rear face is projected radially inward toward the pintle axis, the plane thereof should fall within and intersect the curvilinear profile of the pintle receiving aperture that extends through the strap socket 26C.

In its loading position, the opposite front face 25B of the tail board lies in substantial alignment with the floor plate 13 but leaves a relatively small clearance gap G therebetween so as to virtually constitute a spaceless tail board mounting. When braced by the rigidly mounted end sill as indicated, the bracket 17 is firmly upheld against any anticipated loading that may be imposed upon the overhanging tail edge 15 and this is in turn, further fortified by the reenforcing rivets 22.

When this tail board is swung upwardly into its erected position as shown in dotted and dashed outline, the flat face 25B is brought into abutment with the respective rearmost post faces 16A to make a weatherproof joint therewith. At the same time, the swinging edge 24 is carried downwardly into a position closely contiguous to the floor plate 13 and now lies forwardly of the pintle axis. It will also be observed that the sealing trough then straddles and embracingly receives the tail edge 15 to form a weatherproof seal therewith, all without any interference between the movable and stationary working parts or requiring the pintle to be loosely mounted in the bracket bosses. In the present disclosure, the lip 30 extends outwardly beyond the rear board face 25A and is confined beneath the floor level in all lip swing positions. In erected tail board position, such lip remains spaced from the outboard tail edge 15 and still serves as a supplementary storm seal by which to reenforcingly close any leakage gap that may prevail underneath the tail board edge 24 and allows the erected tail board to abut tightly against both corner posts.

Should it be desired to drop the tail board into a fully depending position as shown in dotted outline, the sill may be set away from the forwardly projecting portion of the gooseneck 26B or be locally notched to provide for suitable clearance space as indicated in Fig. 4.

Figure 6:
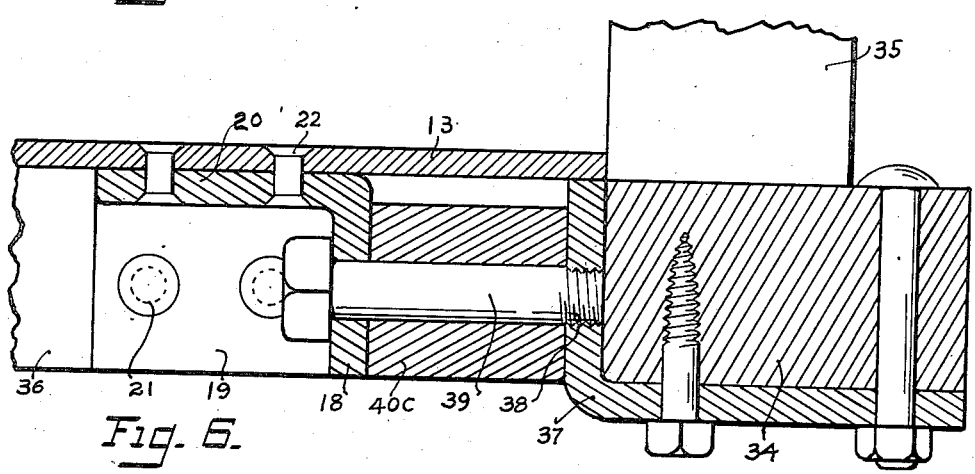
Figs. 6 and 7 represent certain bracket modifications.

Fig. 6 shows an alternative body structure in which each side sill 34 has a rear corner post 35 erected thereon and which posts may be laterally interconnected by the usual transverse or end sill 36. Either side sill may be extended rearwardly beyond its post position. In order to allow the tail board to close inwardly between such mated posts, one of the end bearing fittings shown in Fig. 5, may be modified to include an L shaped bracket 37 that is carried by its adjacent side sill and tapped at 38 to receive the threaded pintle 39 therein. The tubular socket 40C of a gooseneck shank then similarly carries the tail board into its various operative positions.

Figure 7:
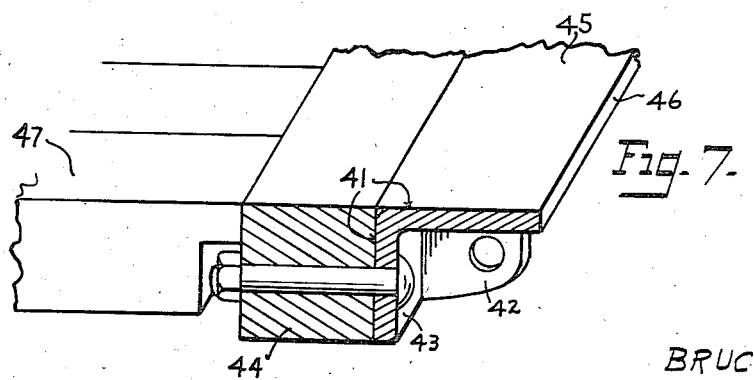

As a further modification, Fig. 7 illustrates a unitary angular bracket fixture 41 having a cross-sectional L shape with a series of pintle receiving boss members 42 welded or otherwise incorporated therein. In this instance, the depending bracket leg 43 may be fixedly secured to the end sill 44 by bolts while the companion leg 45 thereof extends horizontally with its topmost face placed to align with the floor level. The free outermost edge of the aforesaid companion leg terminates in an overhanging transverse edge 46 that in purpose corresponds to the outboard tail edge 15 of Figs. 3 and 4, and which accompanying tailboard strap fittings are otherwise intended to be kept substantially as previously described. It will be obvious that the bracket 41 may be similarly attached directly to the rear transverse edge of the floor boards 47.

When my tail board is closed within or against the corner posts, the gooseneck portions of the respective straps overhang rearwardly and constitute heavy duty bumper means that effectively protect the tail edge 15 from injury in the event the truck or van should inadvertently be backed into an obstruction. All working parts are neatly and compactly disposed and my tail board may be freely swung about its aligned pintles without being obliged to bodily lift such tail gate while being shifted between its several positions. When closed, the innermost tail board edge is adequately sealed by novel rain and storm trap means.

In connection with the described tail board hinge straps and associated line of hardware, it is pointed out that an article of manufacture of this kind is commonly sold as a separate commodity to body builders or the like dealers, who in turn apply the same in standardized sizes to suit the needs of such vehicles as may be in process of construction.

It is thought that the foregoing disclosure will make evident to those skilled in this art, the advantages afforded by my improved tail board fittings, it being understood that I reserve the right to modify any of my illustrative embodiments, all without departing from the spirit and scope of my invention heretofore described and more particularly pointed out in the appended claims.

I claim:

1. In a vehicle body comprising a floor member that extends rearwardly and terminates in a transversely disposed tail edge, pintle means mounted beneath the floor level, a pair of guide straps operatively engaging the pintle means, a tail board having a rear face and an innermost swinging edge carried by the guide straps and which straps in one extreme travel position about said pintle serve to guide the aforesaid innermost board edge into a closely contiguous relationship with the floor member, and a cross-sectionally trough shaped trap of which one longitudinal edge constitutes a sealing lip disposed outwardly beyond the rear tail board face and serves to supplement the seal afforded by the aforesaid contiguous relationship of the board edge, said lip being cooperatively located beneath the tail edge of the floor member and maintaining a clearance space therebetween in all swing positions of said straps.

2. In a vehicle body comprising a floor member that extends rearwardly and terminates in a transversely disposed tail edge, pintle means mounted beneath the floor level, plural guide strap means engaging the pintle means, a tail board including an innermost swinging edge carried crosswise between the guide straps, the axis of said pintle being located to allow the innermost board edge to swing about the pintle axis between certain extreme travel positions without interference with the aforesaid tail edge to include an erected tail board position lying above the floor level in which said innermost swinging edge is guided toward the underlying floor member into contiguous relationship, and open mouthed trap means also carried by the strap means including a sealing lip, the mouth of said trap being disposed to cooperatively receive said tail edge therein with its sealing lip disposed beneath the tail edge of the floor member in spaced relationship when the tail board is swung into said erected travel position.

3. In a vehicle body provided with a transversely disposed end sill member, the combination of a floor plate extending rearwardly beyond said sill to terminate in a tail edge, a pair of brackets mounted beneath the overhanging portion of the extended plate, pintle means carried by said brackets, movable guide strap means for each such bracket, said straps respectively having an intermediate gooseneck formation of which one end region is equipped with socket means that operatively engage the pintle means, a tail board including an innermost swinging edge carried crosswise between the respective straps outwardly beyond the gooseneck formation thereof, said pintle means being disposed to allow the aforesaid innermost board edge freely to swing about the pintle axis between erected and aligned board positions relative to the floor level, and trap means carried by the guide straps in a radially inward relation to said innermost board edge and which trap seals the last named edge when the tail board is guided into its erected position.

4. An article of manufacture adapted to pivotally mount a vehicle tail board and which article comprises a pair of crooked hinge straps each having a gooseneck formation including a yoke portion interposed between the respective ends of said straps, and a cross-sectionally trough shaped trap member located within the respective gooseneck yokes and extending between said straps.

BRUCE M. STANNARD.